Nov. 12, 1940.  C. R. PATON  2,221,488

MOTOR VEHICLE

Filed March 22, 1938  3 Sheets-Sheet 1

FIG-1  FIG-2

FULL LINES - WITH INVENTION
CHAIN LINES - WITHOUT INVENTION

Inventor
Clyde R. Paton
By Watson, Cait, Morser Grindle
Attorneys

Nov. 12, 1940.    C. R. PATON    2,221,488

MOTOR VEHICLE

Filed March 22, 1938    3 Sheets-Sheet 3

Fig. 12

- RUBBER
- LUBRICATED BRONZE
- LUBRICATED BRONZE
- LUBRICATED BRONZE
- LEAD ALLOY - 10% ANTIMONY - 90% LEAD
- LEAD ALLOY - 10% ANTIMONY - 90% LEAD

Fig. 13

- RUBBER
- RUBBER
- RUBBER
- RUBBER
- LEAD ALLOY - 7½% ANTIMONY - 92½% LEAD
- LEAD ALLOY 5% ANTIMONY - 95% LEAD

Fig. 14

- RUBBER
- RUBBER
- RUBBER
- LUBRICATED BRONZE
- LUBRICATED BRONZE
- LEAD ALLOY - 10% ANTIMONY - 90% LEAD
- LEAD ALLOY - 5% ANTIMONY - 95% LEAD

Inventor
Clyde R. Paton
By Watson, Cait, Morse & Grindle
Attorneys

Patented Nov. 12, 1940

2,221,488

UNITED STATES PATENT OFFICE 2,221,488

MOTOR VEHICLE

Clyde R. Paton, Birmingham, Mich., assignor to Packard Motor Car Company, Detroit, Mich., a corporation of Michigan Application March 22, 1938, Serial No. 197,476

12 Claims. (Cl. 267—47)

This invention relates to motor vehicles, and is particularly concerned with elastic suspensions therefor designed to improve the riding qualities thereof.

In automobile engineering parlance the ideal ride is a "flat ride," that is, a ride in which the spring suspended vehicle body rides substantially level when traveling at various speeds over road beds having a variety of surface irregularities. In other words, the body should substantially average out the road contour variations. Theoretically this flat ride requires a certain rather definite weight distribution, such distribution, for instance, as positions the center of percussion for the sprung masses substantially over the front and rear axles or suspension centers.

A second condition which is theoretically necessary to the flat ride has to do with the relationship between the pitch frequency and the bounce frequency, which frequencies are dictated not alone by weight distribution but by wheel base and spring rates. The flat ride requires that the bounce frequency shall predominate over the pitch frequency, and this latter requires certain spring rates of action that cannot always be met in practice.

Could a vehicle be designed to carry a definite load at all times and to have that load definitely distributed by the designer of the vehicle, some other miscellaneous factors being ignored, these theoretical conditions might be substantially met, but since the vehicle designer has certain practical considerations to face, such as the necessity for seating one or several passengers comfortably in the vehicle, and locating the various necessary parts of the vehicle with relation to the seats for those passengers, the theoretically correct weight distribution and theoretically correct relationship between the pitch frequency and bounce frequency must be considerably departed from. It may be said to be one of the objects of the present invention to provide spring suspension or other means between the sprung and unsprung parts of a motor vehicle such that the vehicle will more nearly approach the "flat ride" even though the weight distribution and the spring rates of action are far from ideal.

But not only is the vehicle designer met with practical limitations in weight distribution and spring rates, but, from the manufacturing viewpoint, the design should be such that uniformity in manufacture may be obtained without holding the parts or surfaces to unreasonably close limits and without too drastic inspection and adjustment, and such that the riding qualities built into the vehicle may continue, that is, that there shall be permanence of performance. And of course consideration must also be given to the original cost of building the vehicle, as well as to the cost to the owner in maintaining the original ride built into that vehicle.

The motor vehicle designer also has a variety of road conditions to consider in laying out the spring suspension for a vehicle of given weight and of a given load and speed capacity. For instance, in most concrete roads, particularly in the northern part of the United States, cross bumps are formed by the tar filler in the expansion joints occurring about every fifty feet or so. In addition to these more or less abrupt bumps there will be found other minor irregularities, perhaps of a less abrupt nature, such as the ripples so often found in macadam roads, and for all of these the spring suspension should be sufficiently unyielding and the unsprung weight on the wheels should be sufficiently large so that the tires are forced to absorb the greater part of the irregularities and only a minimum of the shock will be transmitted to the body of the vehicle.

Then there are the major irregularities in road beds, irregularities of all descriptions, and for these the suspension system should be readily yieldable so as to permit the absorption of the resulting wheel movement in the spring system while the body travels on a substantially mean level.

Thus in general it is desirable to provide a complete system which will resist the various wheel movements caused by all of these irregularities, absorb some of them and damp others. The tires should be made to do their portion of the work, the spring system should permit some upward wheel movement of small amplitude and it should permit a rapid upward wheel movement of large amplitude; the latter however should meet an increasing resistance or damping. Such body movement as does occur on failure of the spring system to completely absorb all impulses applied to the wheels should be promptly and efficiently damped, and these body movements, with a proper spring suspension, would be largely movements of relatively low velocity determined by the natural frequency of the body mass and the springs.

To promote an understanding of these and other problems solved by the present invention and to facilitate description thereof, it is convenient to refer herein to that type of vehicle suspension most commonly used at the present time, namely the type which employs leaf springs at least at one end of the vehicle. Such springs are ordinarily constituted by a plurality of separate spring leaves which are secured in face to face relationship and which act between the axle and road wheels and the body, the successive leaves being of different length. It is common practice to secure the longest leaf of the assembly to the body and to connect the axle to that portion of the spring assembly at which all the leaves overlap. It is also common to so design and arrange the individual leaves of the assembly that the tip pressures are substantially equal under normal loading, that is to say, the tip of each leaf bears on the next adjacent leaf with approximately the same pressure. The principal objection to this type of suspension is the high resistance to both vertical and transverse flexure on the occurrence of displacement of the wheels when an obstruction is encountered, this resistance being primarily due to friction between the several leaves. Also, this friction between the leaves, due, in commercial manufacture, to lack of uniform surface smoothness or to lack of uniform contact area, or both, varies over a wide range in springs made to the same specifications, so that in the manufacture of motor vehicles with conventional leaf springs it has heretofore been impossible, in a day's production of vehicles, to get a desired degree of uniformity in the ride of those vehicles, particularly their ride when new. This is unsatisfactory to manufacturer, retail dealer, and owner alike.

Concerning the transverse flexure of leaf springs, it is found that when one road wheel rises or falls abruptly with respect to the wheel on the opposite side, the vehicle body is thrust laterally. For example, when one wheel meets an obstacle and rises, the axle swings upwardly about the point of contact of the opposite wheel with the road bed. The longitudinal vertical planes passing through the points of connection of the oppositely disposed springs to the axle are thus brought closer together, and one or both of the springs must flex laterally. That spring which is the flatter of the two is more resistant to lateral flexure, and the body is displaced toward the opposite side, the opposite spring yielding laterally to permit such movement. The lateral impact thus applied to the body is usually severe owing to the edgewise stiffness of the conventional leaf spring assembly.

As suggested above, the desired "flat ride" is obtained only if fore-and-aft pitching is controlled. For example, when the front wheels of the vehicle strike an obstruction, the rising of the forward part of the body tends to depress the rear portion, the body tending to rock about its center of gravity which is usually somewhere near the middle of the vehicle. The rear springs are accordingly compressed and when the rear wheels shortly thereafter meet the same obstruction, the body rear is thrust upward, the front end being depressed. This starts a pitching or rocking movement which tends to persist and is aggravated if the vehicle meets further obstructions at given intervals. If the springs at one end of the body are too free from friction, that end of the body is depressed too far when the wheels at the opopsite end strike an obstruction, and the pitching movement is not properly damped; if either set of springs is too stiff and characterized by high friction, the end of the body supported by such stiff springs rises too far when the adjacent wheels meet an obstruction and violent pitching results.

Efforts have been made heretofore to improve the characteristics of suspension systems, but such attempts have effected at best nothing more than a compromise resulting in improvement of the suspension action in one respect while adversely affecting the action in another respect. For example, it has been heretofore proposed to minimize interleaf friction in a leaf spring assembly by introducing rubber liners between all of the leaves, but in a vehicle employing such springs both the vertical and transverse movements of the body are insufficiently damped and when once initiated tend to persist. The same is true of springs having anti-friction balls or rollers between the leaves. It has also been proposed to employ inserts of low friction metal such as lubricated bronze between all of the spring leaves, but this also fails to solve the problem since there is still too much resistance offered to rapid wheel movement of large amplitude and the transverse stiffness of the spring is still too great to cushion the lateral impact hereinbefore referred to. Again, the lubricated bronze inserts, like the rubber inserts, fail to afford sufficient damping of the relatively slower body movements.

It is therefore one of the objects of the present invention to so control the movements of the elastically supported body of a road vehicle that the riding qualities thereof will be greatly improved.

Another object of the invention is to provide a vehicle suspension system that produces an improved ride and that maintains the improved ride condition indefinitely.

Another object of the invention is to provide a vehicle suspension system the parts of which are adapted for commercial manufacture to produce uniform results in the vehicle.

Another object of the invention is to control vehicle body movement by so damping relative motion of the wheels and body that low velocity motion is damped to a greater extent than high velocity motion, whereby rapid movement of the wheels is absorbed by spring flexure while the slower body movements are adequately damped.

A further object of the invention is to provide a vehicle suspension system which is automatically adapted to different road conditions, offering considerable resistance to wheel movement of small amplitude, and, as to relative movement of the body and wheels of larger amplitude, offering much less resistance to movement of high than to low velocity.

Another object of the invention is to provide an improved leaf spring construction that will so control the spring action, and indefinitely maintain that control in use, that a greatly improved vehicle ride is obtained.

Still another object of the invention is to provide a vehicle suspension system in which obdy movements are uniformly controlled regardless of variation in body loading.

A more specific object of the invention is to provide a leaf spring assembly with bearing means intermediate the several spring leaves, which bearing means are formed of such materials and are so arranged as to impart to the suspension the characteristics required to overcome the disadvantages inherent in the conventional leaf spring, as hereinbefore pointed out. These bearings or bearing means may be in the form of interliners or inserts and some of them may permit greater freedom of movement between spring leaves or portions of spring leaves, and some less; some are controlling in their action and some act largely as spacers or separators between leaves or parts of leaves. For convenience herein, the term "bearings" or "bearing means" will be used as an all-inclusive phrase covering all of the various bearing and separating and interlining means described.

Further objects and features of the invention will be apparent from the following description taken in connection with the accompanying drawings, in which.

Figure 1:
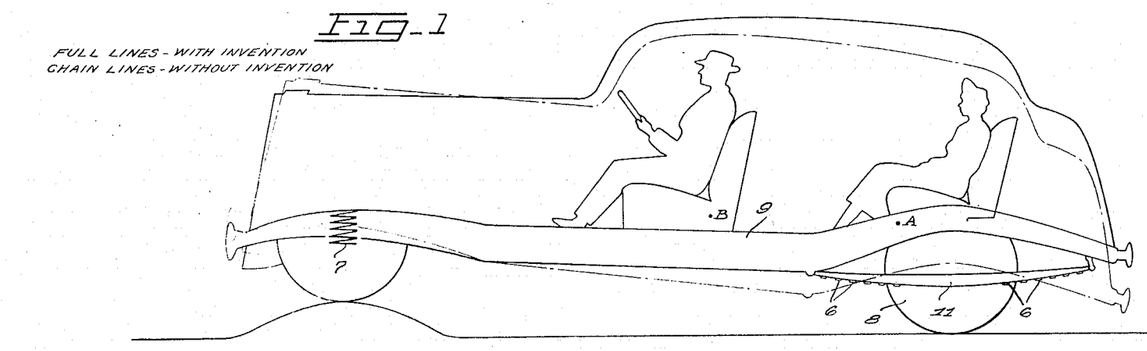
Figs. 1 and 2 are somewhat diagrammatic illustrations of a vehicle, the full lines illustrating the action of the vehicle with the invention, and the broken lines indicating conventional springing.
Figure 2:
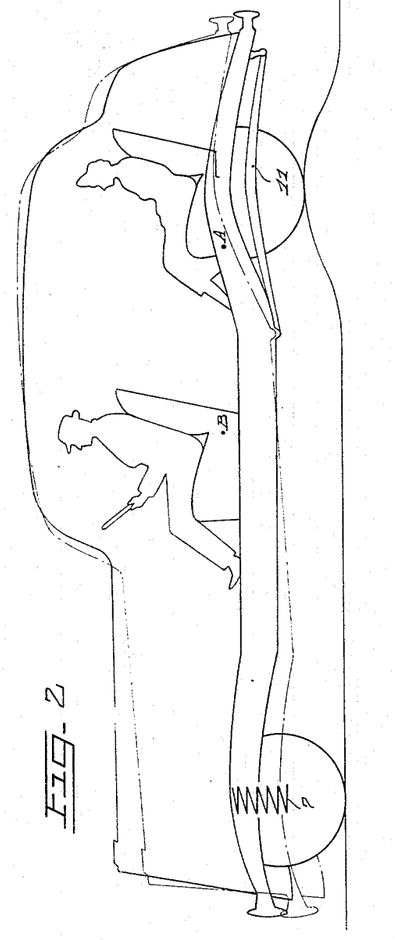

The type of vehicle suspension selected for the purpose of illustrating the invention as shown in Figures 1 and 2 is one employing two longitudinally arranged multiple leaf springs 11, one at each side, at the rear of the vehicle, connecting the frame and body member 9 with the wheel and axle member 8, and an independent suspension including coil springs 7 at the forward end. The leaf spring assemblies at the rear are made in accordance with this invention and the bearings or bearing means are indicated diagrammatically at 6 in Figures 1 and 2.

The springs 11, which will be described in detail hereinafter, mounted as shown, produce a very remarkable result so far as uniformity, and maintained riding qualities of the vehicle, are concerned. Figs. 1 and 2 illustrate the contrast in ride as well as can be done in diagram. These figures show the movements of the vehicle body when the road wheels meet an obstacle, the full lines indicating the positions assumed by the body when the suspension means is constructed in accordance with the principles of this invention, and the broken lines indicating the corresponding positions which would be assumed by the body if the suspension did not employ these principles.

In Figure 1 the front wheels are shown meeting a large obstacle. While these wheels have been thereby forced upward to a considerable height, the forward end of the body has been raised only slightly, the low rate coil springs at the front having readily and rapidly flexed to absorb the major portion of the wheel movement. The rear end of the body has been thereby rocked downwardly only slightly, the static or breakaway friction in the rear springs being sufficiently high to resist and retard the initiation of downward movement of the body rear, and the kinetic damping of these springs being sufficient to materially reduce the extent of such downward movement when once started.

Viewed from another standpoint, the action of the leaf springs at the rear has been so modified by the adjustment of static friction and kinetic damping therein in accordance with the teachings of this invention as to shift to the point A, just forward of the rear axle, the transverse axis about which the body oscillates in fore-and-aft pitching movement, thereby reducing the extent to which the body rear is depressed. If this axis were located at the point B, as would be the case if conventional leaf springs were employed at the rear, the front end of the body would be lifted higher, owing to the less force required to tilt the body about the axis B than about the axis A, and the rear end would be correspondingly lower, such position of the body being indicated in broken lines.

In Figure 2 is shown in full lines the position occupied by the body, elastically supported as taught herein, when the rear wheels encounter the same obstruction shown in Figure 1. Since the rear of the body was depressed but little when the front wheels met the obstruction, the rear springs, only slightly compressed, transmit the upward thrust of the wheel movement to the body with much less force than if the depression of the body rear had been that shown in broken lines in Figure 1. Again, the rear springs, modified as proposed herein, yield quite readily to the rapid upward movement of the wheels; the slower rising movement of the body is damped, and thus reduced to a minimum. The depression of the front end of the body is correspondingly reduced, and the effect of the application of the instant invention to the rear suspension may be observed by comparing the body positions indicated in full lines and in broken lines.

The invention contemplates the use of several types of bearing means in the various spring assemblies of the vehicle, thus regulating the action of those spring assemblies and giving them characteristics which will produce a given result. In a single spring assembly a combination of different types of bearing means may be employed. In the following description the various bearing means and the various combinations are described in some detail because these particular means and combinations have been found desirable, but it will be understood that other specific means and methods and combinations of elements may be employed without departing from the spirit of the invention.

As herein pointed out, a spring suspension system is desirable that provides effective damping for slow body movements while at the same time it permits relatively free rapid vertical motion of the road wheels. Also there must be some static friction to force the tires to absorb the minor irregularities of the road. Heretofore there have been no spring suspensions that would meet these requirements.

The present invention contemplates accomplishing the desired result by the use of special bearing means between the leaves of multiple leaf spring assemblies. Such a bearing means is one which develops relatively little friction between the spring leaves on the occurrence of rapid spring flexure, but which develops a substantial amount of frictional resistance to slow spring flexure. Various materials may be employed for this purpose; in general preference may be given to metals of which the coefficients of friction range between those of lead and bronze. Most suitable for the purpose are lead-base alloys, and an alloy consisting principally of lead and containing a small percentage of antimony gives excellent results.

In the case of a lead-antimony alloy, for example, it is found that for spring movement of relatively low frequency, the friction developed is roughly about twice that developed by a bronze bearing, but whereas the friction offered by a bronze bearing is not altered materially by variation of frequency, the friction offered by the antimony-lead alloy approaches zero at very high spring frequencies. Again, as the pressure applied to a lead-antimony alloy bearing is increased with increasing body load, the friction developed at low spring velocity is correspondingly increased.

Furthermore, the static or breakaway friction characteristics of a lead-antimony alloy may be altered by varying the percentage of antimony present. In general, an increase in the antimony content serves to decrease the static friction developed by the bearing. I may therefore alter the antimony content over a limited range to suit the requirements of the particular spring suspension system to which the invention is applied. In general, I find that an antimony content of the order of about 4% to 15% is highly satisfactory.

I prefer to employ a friction bearing of the character just described between the shorter spring leaves of the assembly in order that the control of body movement may be varied to meet different conditions of loading. Thus an increase of the normal body load results in the application of a greater increase in pressure between the tips of the shorter than the longer leaves. Compensation for such increase in body load should be effected, if possible, without substantial increase in the amount of resistance offered to rapid spring flexure but with considerable increase in the resistance offered to relatively slow flexure. Since the special bearing means just described is primarily effective in damping body movements of low velocity, it is such damping that is primarily increased when contact pressure is raised. Consequently, when these bearings are located between the shortest leaves, the necessary increase in damping of slow movements on increase in body load is effected while the increase in the resistance offered to rapid spring flexure is relatively small.

Under some conditions I find it convenient to augment the action of the friction bearing means just referred to by the employment of further friction bearings of material which is not necessarily responsive to variation in the velocity of spring flexure. A satisfactory material for this purpose is a self-lubricating bronze, but numerous other materials may be employed, including non-metallic material, such as brake lining. Thus if it is found that a given suspension system fails to sufficiently resist relative displacement of the wheels and body of small amplitude, such as result from passage of the vehicle over minor road irregularities, I may find it desirable to employ a friction bearing which is responsive both to slow and rapid spring deflection. Here again, the degree of resistance offered to small deflection may be varied by proper selection of the material of which the bearing is composed. Additional damping of larger vertical spring deflection may also be required, particularly when the deflection is of high velocity, and these bearings may be necessary for this purpose. I may also find it convenient to employ bearings of this character for the purpose of properly locating the transverse axis about which the body rocks. These bearings are furthermore useful for damping lateral relative vibration, since as hereinbefore explained, I prefer to locate bearings of the type represented by the lead-antimony alloy between the shorter spring leaves, and in such a location the bearings are largely ineffective for the purpose of lateral damping.

As pointed out, the lead alloy bearings are employed between the shortest leaves in order that compensation for body loading may be properly effected. Consequently the bearings of bronze or material of similar characteristics, if used, are ordinarily disposed between the intermediate or longer leaves.

Spring flexure in a vertical plane is damped more effectively by the introduction of friction means between adjacent pairs of leaves of greater length owing to the greater amplitude of relative movement therebetween, and it is therefore possible to vary the kinetic damping with relation to the static friction by altering the position of the friction bearing means of whatever type employed. It is also found that the point about which the body rocks when one end thereof is displaced may be shifted toward the other end by increasing either the kinetic damping or the static friction, or both, in the suspension system at such other end. Thus the point in question may be so located, by introduction of friction bearings between selected pairs of leaves, as to reduce fore-and-aft rocking or pitching of the body to a minimum, thus more nearly approaching the desired "flat ride." A similar effect may be achieved by proper selection of the materials of which the friction bearings are composed, both kinetic damping and static friction being thereby altered; accurate regulation of the static friction and damping is often secured by a combination of these methods, and under some conditions the use of different types of bearings between different leaves, or even the same leaves, of the same spring assembly may be necessary to so control body rocking that other desired functions and advantages of the bearings described herein may not be impaired.

When the selection of the desired bearing means between certain of the leaves of a given spring assembly has been made, the remainder of the leaves, if any, should be so treated that they will not alter the result accomplished by that part of the spring to which such bearing means has been applied. This means that there should be a minimum of friction between the tips at least of these remaining leaves and this is particularly true of static or breakaway friction. Since the lead alloy bearings and the lubricated bronze bearings have preferably been inserted between the shorter and the intermediate length leaves, respectively, there usually remains only the longer leaves to be treated. Also, it is desirable that whatever is done with these leaves they should move noiselessly, they should preferably not require lubrication, and they should retain their original status indefinitely.

Anti-friction rollers or balls may be interposed between these adjacent longer spring leaves, but I prefer to employ rubber bearing means in whole or in part for this purpose, since such means, in addition to offering a minimum of friction on relative displacement of the leaves, also serve as insulation against vibration and noise, require no lubrication, are subject to little wear, and are not affected by varying operating conditions. Since these longer leaves have greater edgewise or lateral deflection, the rubber bearing means between them is thereby more effective in permitting the slight lateral movement of the body while cushioning the impact of the lateral thrust. If no spring clips are used the lateral displacement of adjacent spring leaves will occur mainly between the two longest leaves. However, when spring clips are employed the lateral forces applied to the longest leaf are transmitted to some extent to several of the other leaves, and in this case the rubber bearing means may be employed between two or three pairs of leaves.

Generally I find that it is not desirable to use these special bearing means throughout the length of the spring leaves. If one of them is applied at the tip of a leaf and does not separate the tip too far from the adjacent leaf only a small portion of the leaf will be out of contact with the leaf above it and the remaining portion of the leaf will retain its frictional contact with the leaf above. This "remaining portion" which constitutes the mid-section of the leaf of a semi-elliptic spring thus retains its usual function of friction damping but is appreciably effective only after there has been an initial movement of the separated ends of the leaf. This mid-section damping, as it may be called, is particularly useful in control of major spring flexure, but owing to inevitable variation in surface conditions of the spring leaves when new and changes in friction characteristics thereof with use, it is employed with the present invention only as one of the factors contributing to the desired ride result. Again, it is quite important that bearing means of the lead-base alloy type be frictionally engaged with a small portion only of the leaf area, since it is found that the establishment of a high pressure at the engaging surface of such a bearing means is a significant factor in the successful performance of its intended function as hereinbefore outlined.

In this connection, it can be shown that the degree of hardness and the pressure melting relationship of the special bearing means, such as the lead base alloy, are characteristics which determine largely the usefulness for the intended purpose of the material of which the special bearing means is formed. Thus it is believed that the roughened surfaces of the leaves are actually embedded in the bearing means under the pressure established by the normal spring loading, and that on the occurrence of spring flexure, the added pressure resulting from movement of the relatively rough leaves across the bearing means causes the bearing means to melt at the surface. If the flexure, and the consequent movement, is sufficiently rapid, the melted condition of the bearing means will persist during the movement, and thus relatively little resistance will be offered to the movement, the action being analogous to that of a skate on ice. If, however, the flexure and movement are slow, the surface of the bearing means either fails to melt because of lack of sufficient pressure, or rapidly and repeatedly melts and hardens during the movement, so as to afford relatively high resistance to movement and flexure.

In this connection, it can be shown that the degree of hardness and the pressure melting relationship of the special bearing means, such as the lead base alloy, are characteristics which determine largely the usefulness for the intended purpose of the material of which the special bearing means is formed. Thus it is believed that the roughened surfaces of the leaves are actually embedded in the bearing means under the pressure established by the normal spring loading, and that on the occurrence of spring flexure, the added pressure resulting from movement of the relatively rough leaves across the bearing means causes the bearing means to melt at the surface. If the flexure, and the consequent movement, is sufficiently rapid, the melted condition of the bearing means will persist during the movement, and thus relatively little resistance will be offered to the movement, the action being analogous to that of a skate on ice. If, however, the flexure and movement are slow, the surface of the bearing means either fails to melt because of lack of sufficient pressure, or rapidly and repeatedly melts and hardens during the movement, so as to afford relatively high resistance to movement and flexure.

To facilitate an understanding of the invention, specific language is employed in describing the several structures illustrated in the drawings. It will nevertheless be understood that no limitation of the scope of the invention is thereby intended, but that various modifications and alterations of this structure are contemplated such as would occur to one skilled in the art to which the invention relates. Thus the invention is illustrated in the accompanying drawings and described in detail herein as applied to the modification of conventional leaf spring assemblies. As will be apparent from the following description, modification of other elements of various types of suspension systems in accordance with the principles broadly outlined hereinbefore will produce a greatly improved ride.

Figures 3, 4, 5, 6:
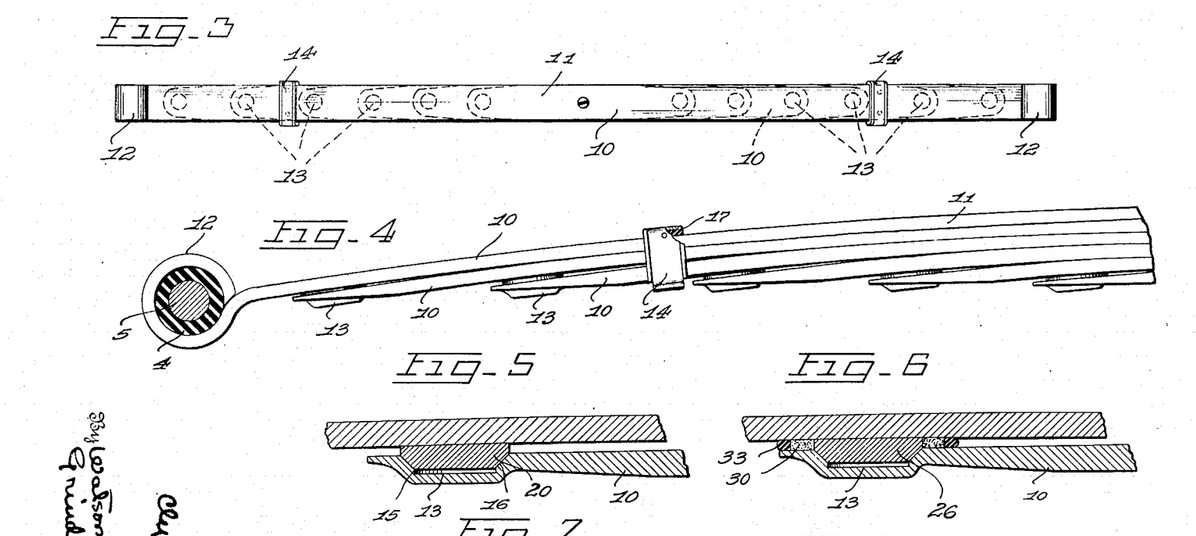
Fig. 3 is a plan view of one of the two leaf springs of the vehicle shown in Figs. 1 and 2.
Fig. 4 is an enlarged side elevation of a portion of the spring shown in Fig. 3.
Figs. 5 to 9 and 11, inclusive, are enlarged sectional views illustrating several different forms of bearings or bearing means used between the spring leaves.

Referring first to Figures 3 and 4, illustrating a leaf spring 11 to which the invention has been applied, it will be noted that the spring is constructed of a plurality of spring leaves 10 in face to face relation, the successive leaves being of increasing length and the longest leaf being formed to provide eyes 12 at the ends thereof, which eyes may be suitably connected to the vehicle frame as by bolt 5 and rubber sleeve 4. The central portion of the spring assembly may be secured to the axle in any conventional manner and one or more spring clips 14 may be employed, each of these clips comprising a metallic element preferably lined with rubber 17 and surrounding the spring to clamp the leaves yieldingly together. One function of the rubber is to permit slight relative displacement of the adjacent leaves, to afford the required degree of freedom of movement.

At least certain of the leaves of the spring assembly, and preferably each of these leaves, may be provided with depressions 13 adjacent the opposite ends thereof for the reception of the bearings or bearing means above referred to and indicated generally at 6 in Figures 1 and 2. As herein explained, these bearing means may vary materially in structure and character, but are preferably constituted by selected combinations of elements formed of metallic or non-metallic compositions, self-lubricating metal, and rubber. The elements may be so shaped that when the leaves are assembled they are retained in their respective leaf depressions against displacement, each element preferably serving to space the adjacent pair of leaves for a portion only of their length, so that the relation between the central portions of the leaves is not materially altered.

In Figure 5 the depression 13 at one end of a leaf 10 is formed to include an outwardly flared or generally conical portion 16. One of the bearings of the lead alloy or the self-lubricating bronze type is correspondingly shaped to seat snugly therein as shown at 20. The bearing means 20 extends slightly above the depression and contacts with the next adjacent leaf, thus separating the leaves slightly at this point.

Figures 7, 8:
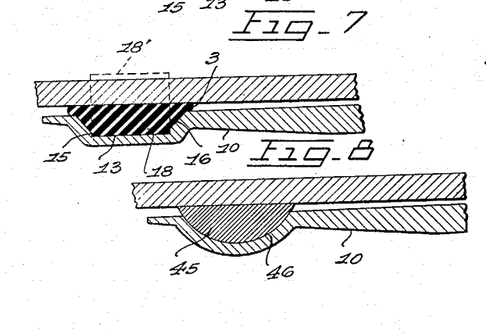

In Figure 7 the depression 13 of the spring leaf is formed to provide a generally cylindrical portion 15 and an outwardly flared portion 16. A rubber element 18 is initially generally cylindrical in shape, as shown in dotted lines at 18', and is dimensioned for reception in the cylindrical portion 15 of the depression. When the next adjacent spring leaf is clamped in position, the outer portion of the rubber element is compressed and deformed so that it expands and completely fills the depression 13 and may spread laterally to form a flange between the opposed leaf surfaces as shown at 3 in Figure 7. The depression 13 for the metal element and that for the rubber element may for convenience be formed alike to permit interchangeability of the metallic and rubber elements, and they are so illustrated.

As herein indicated, certain preferred metallic bearing elements are not necessarily of the self-lubricating type. It is nevertheless sometimes desirable to uniformly lubricate these elements to prevent wear and squeaking and to exclude dirt from the coacting surfaces, and for this purpose the construction shown in Figure 6 may be employed. In this arrangement an element 26, comprising, for example, the soft metal lead-antimony alloy referred to, is received in a depression 13 in one of an adjacent pair of spring leaves. A washer 30, preferably of felt or other fibrous absorbent material, is interposed between the leaves and surrounds the element 26, the washer being thoroughly impregnated with oil, grease, or other lubricating medium. Surrounding the washer is an annular element 33 constituting a sealing medium to prevent the discharge of lubricant and to exclude dirt; the element 33 may be formed of rubber so prepared as to resist deterioration by the action of the lubricant.

Figures 9, 10, 11:
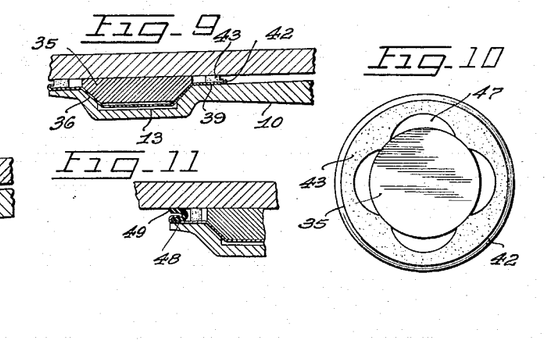
Fig. 10 is a plan view of the bearing means unit of Fig. 9.

A further method of mounting the bearing means to ensure adequate and uniform lubrication of the friction element thereof is illustrated in Figures 9, 10, and 11. The element 35 shown here is received in a generally cup-shaped member 36 which in turn fits within the depression 13 in the spring leaf 10. The member 36, which may be of brass, is formed to provide a peripheral annular flange portion 39, which overlies the upper face of the spring leaf, and of which the outer edge is reversely bent or crimped as indicated at 42 into clamping relation with the outer edge of an absorbent washer 43. The portion of the washer thus engaged is compressed by the crimped portion of the member 36 and thus securely retained against unintentional displacement.

As shown in Figure 10, the inner circumference of the washer 43 is relieved or cut away at a plurality of points, as shown at 47, to provide reservoirs or pockets adjacent the periphery of the element 35, and lubricant may be introduced in these pockets. To further protect the friction element a rubber ring 48 may surround the felt washer 43, this ring being bent back on itself in cross section as shown in Figure 11, and the crimped edge of the member 36 will secure the ring in place. The bevelled free periphery 49 of the rubber ring will form an effective seal. This arrangement has the advantage that lubricant is retained in the cup-shaped member 36 and cannot escape between the washer and the lower leaf. Also, the device, as shown in Figure 10, may be assembled as a unit to facilitate introduction in the spring leaf pockets.

Turning now to Figure 8, it will be noted that the lower side of the bearing element 45 is of generally spherical shape and is seated in a corresponding spherical recess 46 in the face of the spring leaf 10. With this construction initial alignment of the contacting surfaces of the bearing element and the adjacent spring leaf is assured, and this alignment is maintained regardless of the extent of deflection of the spring. Any of the methods hereinbefore outlined may be employed with this construction for the purpose of ensuring adequate lubrication.

Now considering the several bearing means hereinbefore referred to and described, the lead alloy bearing means, consisting principally of lead and antimony, provides static or breakaway friction of a high order, and this is variable within limits by changing the percentage of antimony used. This bearing means also provides high damping of low frequency spring flexure but a very low damping of high frequency spring flexure.

The lubricated bronze bearing means provides low to medium static or breakaway friction, and medium damping of both high and low frequency spring flexures.

The rubber bearing means, flowing or acting in shear, allows a relatively free movement of one leaf on another, insulates and prevents vibration transfer between the spring and body, and assures noiseless action. This rubber bearing means has no appreciable effect in the damping of either high or low frequency spring flexure and its static or breakaway friction value is practically zero.

By the selection of different combinations of these various bearing means a spring system is obtained which produces a greatly improved ride and which will be indefinitely maintained with minimum service attention.

Figure 12:
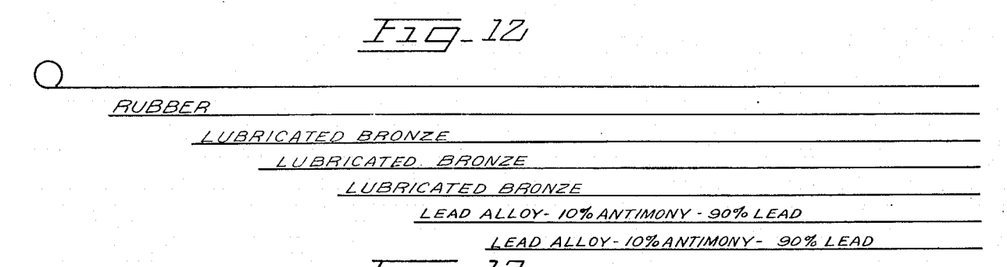
Figs. 12, 13, and 14 are diagrammatic views illustrating leaf spring assemblies employing different arrangements of the several forms of bearing means.
Figure 13:
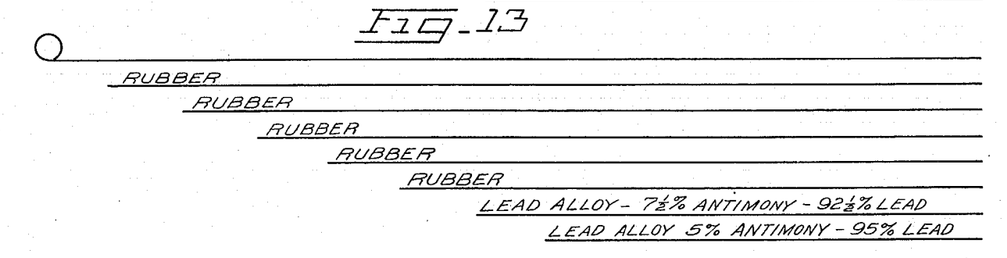
Figure 14:
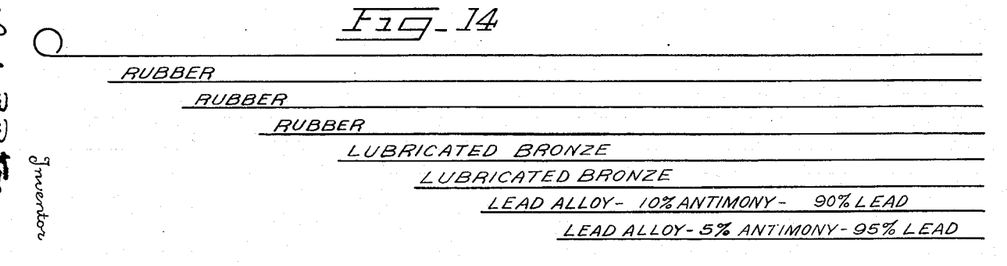

In Figures 12, 13, and 14 are illustrated diagrammatically several different methods of applying the principles herein outlined. Thus in Figure 12 it will be observed that between the two shortest pairs of spring leaves an alloy of lead and antimony is employed, in this case the alloy containing 10% antimony. The next three bearing means are formed of lubricated bronze, and then, between the longest pair of leaves a rubber bearing is employed. In Figure 13, between the shorter leaves are bearings of lead alloy, the first containing 5% antimony and the second 7½% antimony, and the next five bearings are of rubber. No bronze bearings are used here. In Figure 14 the bearings between the shortest leaves are composed of lead alloy containing 5% and 10%, respectively, of antimony; the next two are lubricated bronze, and the other three bearings are of rubber.

It will be noted that the lead alloy bearings are employed between the shortest leaves in each case, one reason being, as pointed out above, that compensation may thus be had to the greatest extent for variation in body loading. The lubricated bronze bearings where used are between the intermediate leaves, and after these combinations of bearings have been decided upon the remaining leaves are separated at their ends by the rubber bearings, all as pointed out hereinabove.

In selecting the materials of which the several bearings are composed and the location of these bearings, the action of conventional vehicle shock absorbers may be taken into consideration. Thus in the spring shown in Figure 13, the elimination of the bronze bearings has been partly compensated for by decreasing the antimony content of the lead alloy bearings, thereby enabling the latter to damp more effectively the low velocity spring movements; the damping of high frequency movements and the resistance to movements of small amplitude is increased by adjustment of the shock absorbers, for example, by reducing the size of the orifice. It is nevertheless found extremely difficult if at all possible in practice to properly deal with small spring deflection by shock absorber control, and it is in general preferable to employ one or more friction bearings of the bronze type in the springs as shown in Figures 12 and 14. It is of course also necessary to consider, in selecting the location and composition of the several fiction bearings, the characteristics of the springs at both ends of the vehicle and the distribution of the body mass, which factors determine the amplitude and natural frequency of the body movements. The application of the invention to a suspension system of the type just described has proven in practice to be highly successful. It may nevertheless again be pointed out that the invention is not so limited in its application. Thus I contemplate modification of various types of suspension employing springs of various nature and disposition. Under some circumstances the desired results may be achieved by modification of elements of a suspension other than the springs. Also, friction bearings offering a different degree of damping to low and high velocity movement may be introduced at various points in a suspension system, and such points may be selected so that the bearings in question will properly compensate for variation in body loading.

Having thus described the invention, what is claimed as new and desired to be secured by Letters Patent is:

1. A leaf spring assembly for use in motor vehicles, said assembly having bearing means interposed between certain pairs of adjacent leaves thereof, said bearing means being formed respectively of rubber, lubricant impregnated bronze and lead-base alloy.

2. A leaf spring assembly for use in motor vehicles, said assembly being provided with bearing means including rubber between the longest leaves thereof, bearing means having a higher coefficient of friction than bronze between a pair of short leaves thereof, and bearing means having a coefficient of friction of the order of that of bronze between certain leaves of intermediate length.

3. A leaf spring assembly comprising a plurality of leaves, at least one of said leaves having a depression in one face thereof, a bearing element seated in said depression and engaging the next adjacent leaf, lubricant impregnated means interposed between said leaves and surrounding said element, and a rubber sealing ring surrounding said impregnated means.

4. A leaf spring assembly comprising a plurality of leaves, at least one of said leaves having a depression in one face thereof, a bearing element seated in said depression and having a flat bearing surface engaging the next adjacent leaf, and lubricant impregnated means interposed between said leaves and surrounding said element.

5. A leaf spring assembly comprising a plurality of leaves, at least one of said leaves having a depression in one face thereof, a member having a cup-shaped portion received in said depression, said member being provided with a peripheral flange overlying the said leaf face, a bearing element seated in the cup-shaped portion of said member and engaging the next adjacent leaf, and lubricant retaining means carried by the peripheral flange of said member and surrounding said element.

6. A leaf spring assembly comprising a plurality of leaves, at least one of said leaves having a depression in one face thereof, a member having a cup-shaped portion received in said depression, said member being provided with a peripheral flange overlying the said leaf face, a bearing element seated in the cup-shaped portion of said member and engaging the next adjacent leaf, and lubricant impregnated means carried by the peripheral flange of said member and surrounding said element, the peripheral flange of said member being deformed to engage and clamp said lubricant impregnated means in position.

7. A leaf spring assembly comprising a plurality of leaves, at least one of said leaves having a generally spherical depression in one face thereof, and a rigid bearing element having a generally spherical portion dimensioned for reception in said depression and having a substantially flat face for engagement with the next adjacent leaf.

8. A leaf spring assembly for use in motor vehicles, said assembly having bearing means interposed between certain pairs of leaves thereof, the bearing means between different pairs of leaves differing in damping characteristics, one such bearing means offering negligible damping, another such bearing means damping more effectively spring deflection of low than of high velocity, and a third such bearing means exerting effective damping of magnitude which is substantially independent of deflection velocity.

9. In a motor vehicle, the combination with a vehicle body, of road wheels, means elastically supporting said body on said wheels, said means including a leaf spring assembly, of bearing means intermediate at least one pair of adjacent leaves to damp spring deflection, said bearing means being formed of a lead-base alloy containing antimony in amount of the order of 4% to 15%, said bearing means frictionally engaging a leaf end section over a small portion only of the leaf area.

10. In a motor vehicle, the combination with a vehicle body, of road wheels, means elastically supporting said body on said wheels, said means including a leaf spring assembly, of bearing means intermediate at least one pair of adjacent leaves, said bearing means having a degree of hardness and pressure melting temperatures comparable to lead or lead-base alloys, these and the other characteristics of said bearing means being such as to afford materially greater damping of spring deflection of low than of high velocity, and bearing means intermediate at least one pair of adjacent leaves, the characteristics of said last named bearing means being such as to afford damping of spring deflection of a magnitude which is substantially independent of deflection velocity, said first named bearing means frictionally engaging the end section of the leaf over a relatively small portion only of the leaf area.

11. In a motor vehicle, the combination with a vehicle body, of road wheels, means elastically supporting said body on said wheels, said means including a leaf spring assembly, of bearing means intermediate at least one pair of adjacent shorter leaves to damp spring deflection, said bearing means being formed of a lead-base alloy, said bearing means frictionally engaging a leaf end section over a small portion only of the leaf area, and bearing means intermediate at least one pair of adjacent longer leaves, the characteristics of said last named bearing means being such as to afford damping of spring deflection of a magnitude which is substantially the same at high and low deflection velocities.

12. In a motor vehicle, the combination with a vehicle body, of road wheels, means elastically supporting said body on said wheels, said means including a leaf spring assembly, of bearing means having a degree of hardness and pressure melting temperatures comparable to a lead-base alloy containing antimony in amount of the order of 4% to 15%, said bearing means frictionally engaging a leaf end section over a portion of the leaf area which is sufficiently small to enable said bearing means to afford materially greater damping of spring deflection of low than of high velocity.

CLYDE R. PATON.